Sept. 20, 1955 E. A. WHITE 2,718,594

CONTROLLABLE SWEEP GENERATORS

Filed Feb. 20, 1952

INVENTOR.
EDWARD A. WHITE
BY R. P. Morris
ATTORNEY

United States Patent Office 2,718,594
Patented Sept. 20, 1955

2,718,594

CONTROLLABLE SWEEP GENERATORS

Edward A. White, Fort Wayne, Ind., assignor to International Telephone and Telegraph Corporation, a corporation of Maryland Application February 20, 1952, Serial No. 272,539

7 Claims. (Cl. 250—36)

This invention relates to electric wave generators and more particularly to apparatus for generating a voltage having a constant amplitude range but having a variable reference level.

More particularly, the invention relates to apparatus for the generation of a recurrent electric wave of predetermined amplitude between two voltage points, but having a variable voltage reference level.

In some electronic applications, it is advantageous to generate voltages of a particular waveform. Voltages having a sawtooth waveform are extremely useful for control of a variety of circuits including for instance, the scanning circuit of a cathode ray tube, as is well known. It is important that a sawtooth voltage when used as a time-base, have a linear rise between two voltage points whose difference remains constant. On the other hand, it may be desirable to alter the reference level, or the starting point corresponding to the lowest of said voltage points, according to a predetermined pattern.

The prior art discloses devices wherein it was possible to obtain generated voltages having a predetermined waveform and in which it was possible to alter by manually operable means, the reference level of the voltages between predetermined limits.

An object of this invention is to provide a device which will enable the generation of a voltage having a constant amplitude range between two voltage points but having a variable reference level which may be automatically adjusted.

Another object of this invention is to provide a device which will enable the generation of a voltage having a constant amplitude between two voltage points but having a reference level which may be automatically varied in accordance with a predetermined pattern.

In accordance with my invention, there is provided a device for producing a voltage of constant amplitude range but having a variable reference level comprising an electron discharge device having a grid, and a pair of electrodes providing a discharge path therebetween, a source of electrode potential, constant-voltage maintaining means having one terminal connected to one of said electrodes, an impedance serially connected between another terminal of the constant voltage maintaining means and the source, an utilization device operative between fixed amplitude levels coupled in shunt with the constant voltage maintaining means, and means for applying a variable control voltage to the grid to vary the current flowing through the impedance and the voltage maintaining means.

The above-mentioned and other features and objects of this invention and the manner of attaining them will become more apparent and the invention itself will be best understood by reference to the following description of two embodiments of the invention taken in conjunction with the accompanying drawings in which.

Figure 1:
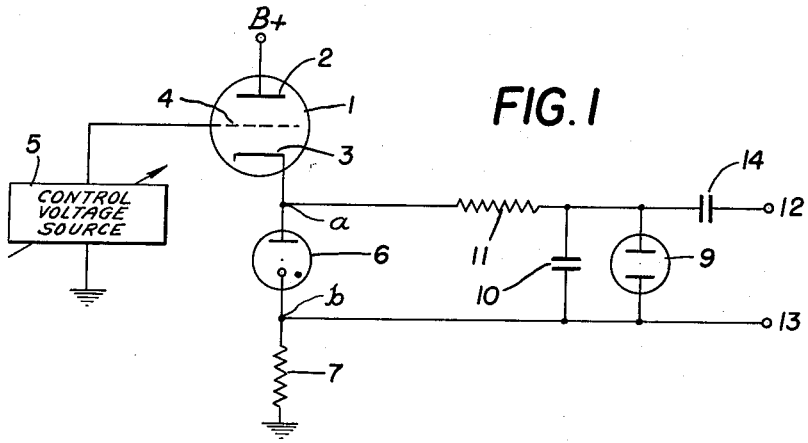
Fig. 1 is a circuit diagram of one embodiment of my invention.

Referring now to Fig. 1, an electron discharge device 1 having an anode 2, cathode 3 and a control electrode 4 is provided and having a source of variable control voltage 5 (shown in block form), coupled to the control electrode 4. A voltage maintaining device 6 providing a constant voltage differential between points ($a$) and ($b$), may be a two-electrode gas filled tube, has one terminal thereof connected to cathode 3 and its other terminal connected to cathode resistor 7. Resistor 7 is connected to ground. A relaxation oscillator of a known type may be coupled across device 6. One such oscillator is indicated generally at 8, and comprises a gas discharge tube 9 shunted by a condenser 10 and in series with resistor 11. The oscillator 8 is connected in shunt with the constant voltage maintaining device 6 so that the voltage supplied thereto will be of a fixed value corresponding to the voltage drop across the device 6. As is well known, the amplitude of the voltage generated by relaxation oscillator 8 is determined by the applied voltage and the period by the values of capacitor 10 and resistance 11. In the illustrated circuit the reference level ($b$), or voltage above ground, is determined by the voltage drop in resistor 7. Tube 1 is so biassed that it will conduct current therethrough in direct proportion to the amplitude of the control voltage applied to the grid 4 from the source 5. The voltage drop across resistor 7 will depend upon the amount of space current flowing through the discharge tube 1, and device 6 and consequently, the potential above ground of point $b$ will vary in accordance with the changes in the input voltage applied to the grid 4 of tube 1. Thus, the potential points $a$ and $b$ will vary with respect to ground directly with the input voltage, whilst the voltage difference between points $a$ and $b$ remains substantially constant.

Figure 2:
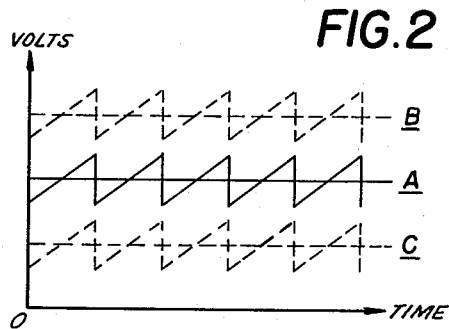
Fig. 2 is a graphical aid to the understanding of the invention.

The waves produced by oscillator 8 will correspond to the waveforms shown in Fig. 2, wherein curve A represents the waveform of an output for a particular value of input voltage applied to tube 1, and curve B represents the waveform of the output of oscillator 8 in response to an increased input voltage applied to tube 1. Curve C represents the waveform of the output of oscillator 8 in response to a decreased input voltage applied to tube 1 as compared with the voltage applied to the tube and which produced the waveform of curve A. It should be distinctly understood that the curves shown are not exact but merely illustrative of the shift above the abscissa of the graph of the reference level of the output wave.

The output voltage derived from the generator 8 will be produced across terminals 12 and 13 via coupling condenser 14. It will be apparent that a higher input voltage will shift the curve in the direction of the arrow H, and a lower input voltage will shift the curve in the direction of the arrow L.

The scope of this invention is not limited to any particular kind of voltage generator and in fact any type of generator generating any voltage having any particular wave shape is intended to be covered hereby. My invention will enable the production of a desired wave shape of predetermined amplitude between two voltage points, but having a variable voltage reference level.

Figure 3:
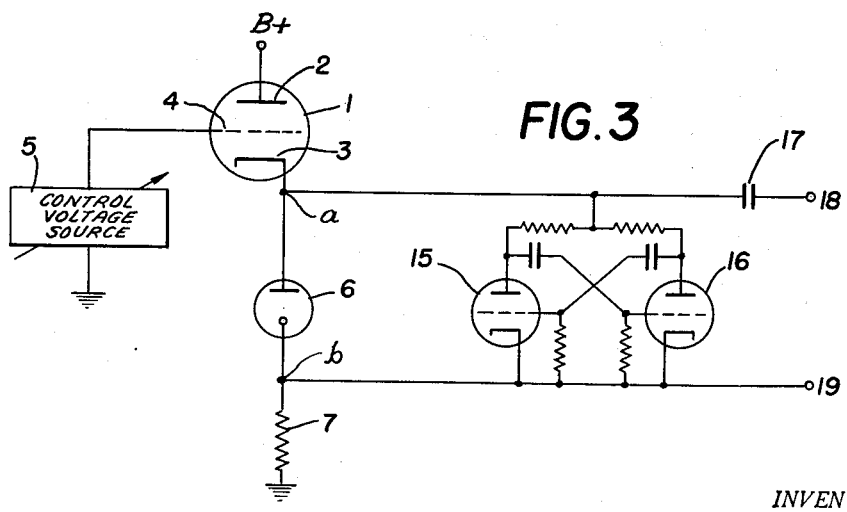
Fig. 3 is a circuit diagram of another embodiment of my invention.

In Fig. 3, I disclose another embodiment of my invention wherein a multivibrator consisting of tubes 15 and 16 is utilized to produce a square-wave output which will have a variable reference level as explained in connection with the embodiment shown in Fig. 1. The multivibrator arrangement shown in Fig. 3, is a free-running oscillator, but it is within the scope of my invention to utilize a driven or triggered oscillator of the well-known Eccles-Jordan type (not shown) in order to obtain a particular voltage output, having a variable reference level. In the event the multivibrator is used, it may be desirable to utilize the coupling condenser 17 to render the multivibrator independent of the output load which may be placed across output terminals 18 and 19.

While it is preferable to provide the control resistor and constant voltage maintaining device in the cathode lead of the anode-cathode discharge circuit of the discharge tube 1, it will be understood that this particular location is not essential to the operation of the invention. Moreover it will be clear that tubes other than triodes may be used if desired, and the control resistor and constant voltage maintaining device may be connected between different electrodes thereof.

While I have described above the principles of my invention in connection with specific apparatus, it is to be clearly understood that this description is made only by way of example and not as a limitation to the scope of my invention as set forth in the objects thereof and in the accompanying claims.

What is claimed is:

1. A device for providing a constant amplitude voltage having a variable reference level comprising an electron discharge device having a grid, and a pair of electrodes providing a discharge path therebetween, a source of electrode potential, constant-voltage maintaining means having one terminal connected to one of said electrodes, an impedance serially connected between another terminal of said constant voltage maintaining means and said source, an utilization device operative between fixed amplitude levels coupled in shunt with said constant voltage maintaining means, and means for applying a variable control voltage to said grid to vary the current flowing through said impedance and said voltage maintaining means.

2. A device for providing a constant amplitude voltage having a variable reference level as claimed in claim 1, wherein said utilization device comprises means for generating a regularly recurring voltage having a particular waveform.

3. A device for providing a constant amplitude voltage having a variable reference level as claimed in claim 1, wherein said utilization device comprises a gas-tube sawtooth generator.

4. A device for providing a constant amplitude voltage having a variable reference level comprising an electron discharge device having a grid and a pair of electrodes providing a discharge path therebetween, a two terminal source of electrode potential having a first terminal thereof connected to a first one of said electrodes, a two-terminal constant voltage maintaining means having one terminal thereof connected to a second of said electrodes, an impedance serially connected between the second terminal of said voltage maintaining means and said source, an utilization device operative between fixed amplitude levels coupled in shunt with said voltage maintaining device, and means for applying a variable control voltage to said grid to vary the current flowing through said impedance and said voltage maintaining means.

5. A device for providing a constant amplitude voltage having a variable reference level as claimed in claim 4, wherein said generator comprises a capacitor, a neon gas discharge tube in shunt with said capacitor, and a resistor coupled between said capacitor and said second electrode.

6. A device for providing a constant amplitude voltage as claimed in claim 4 wherein said impedance comprises a resistor across which a voltage is produced variable directly with said variable control voltage.

7. A device for providing a constant amplitude voltage having a variable reference level comprising an electron discharge device having a grid, a cathode and an anode providing a discharge path therebetween, a source of anode potential connected to said anode, a two-terminal constant-voltage maintaining means having one terminal thereof connected to said cathode, a first resistor serially connected between said source and the other terminal of said constant voltage maintaining means, a sawtooth voltage generator comprising a second resistor and a gas filled discharge device in series-parallel connection with said constant-voltage maintaining means, a capacitor in shunt connection with said gas-filled device, means for applying a variable control voltage to said control electrode to vary the current flowing through said discharge path whereby the amplitude of the voltage generated by said generator remains substantially constant and the reference level thereof varies in accordance with said variable control voltage.

References Cited in the file of this patent

UNITED STATES PATENTS

| | | |
|---|---|---|
| 2,352,219 | Olesen | June 27, 1944 |
| 2,555,999 | Ringbe | June 5, 1951 |
| 2,627,031 | Moore | Jan. 27, 1953 |